Jan. 12, 1965 E. W. MANTEUFFEL ETAL 3,165,685
SOLID-STATE COMMUTATOR DIRECT CURRENT
MOTOR EMPLOYING HALL EFFECT ELEMENTS
Filed April 18, 1962 3 Sheets-Sheet 1
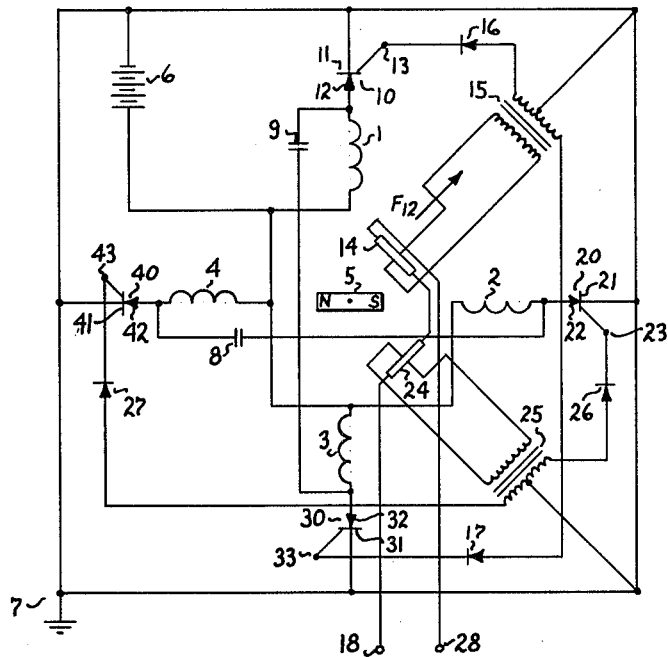
FIG.1
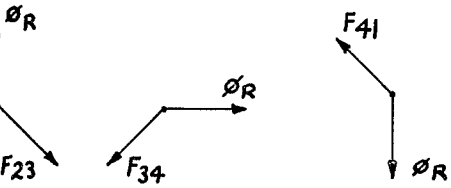
FIG.2ᵃ  FIG.2ᵇ  FIG.2ᶜ  FIG.2ᵈ
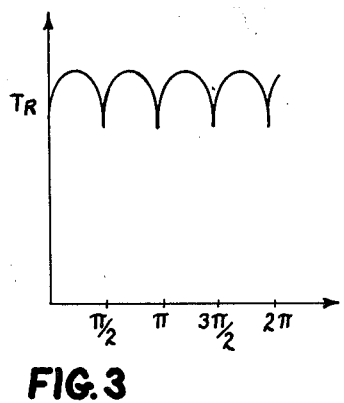
FIG.3
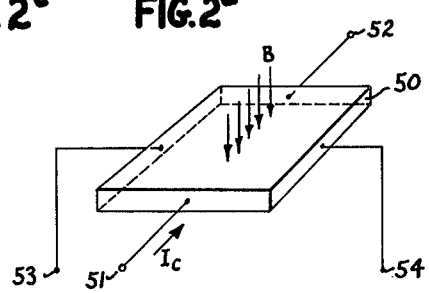
FIG.4
INVENTORS
ERICH W. MANTEUFFEL
GEORGE KOVATCH
BY Robert H Montgomery
ATTORNEY

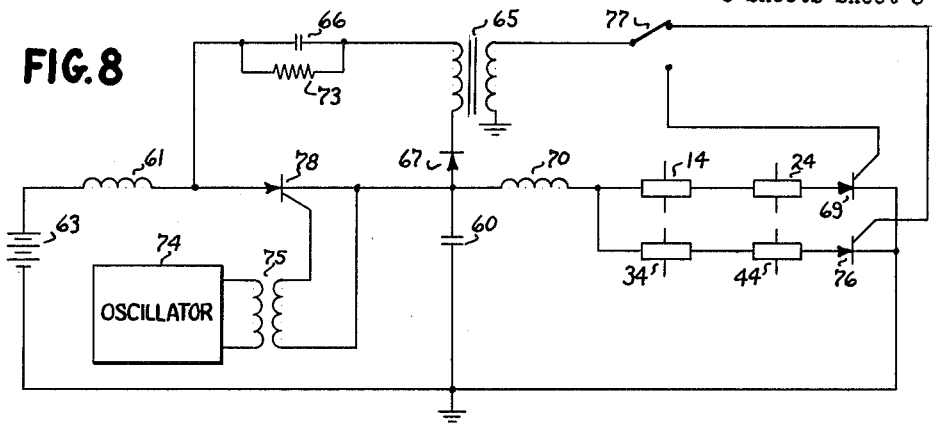

United States Patent Office 3,165,685
Patented Jan. 12, 1965

3,165,685
SOLID-STATE COMMUTATOR DIRECT CURRENT MOTOR EMPLOYING HALL EFFECT ELEMENTS
Erich W. Manteuffel and George Kovatch, Ithaca, N.Y., assignors to General Electric Company, a corporation of New York
Filed Apr. 18, 1962, Ser. No. 188,439
14 Claims. (Cl. 318—138)

This invention relates to electric motors and more particularly to a motor adapted to be energized from a direct current source and which requires no mechanical commutator.

Conventional direct current motors require mechanical commutators to supply current to motor armature windings, and while these commutators generally perform this designed function, their use presents features and/or problems which it would be desirable to eliminate, such as refinishing of commutator wearing surfaces, possible arcing between brushes and commutator segments, and arcing between commutator segments which may result from abrupt interruption of current in the armature windings and periodic brush replacement.

It would be desirable to have a direct current motor which has no mechanical commutator or current collector and thus avoid the problems associated with such commutators or collectors. Moreover, some applications and/or environments detrimentally contribute to the efficient operation of carbon brushes. In such applications, a commutatorless direct current motor would be most attractive.

In the copending application, Serial No. 159,539, filed December 15, 1961, of E. W. Manteuffel, assigned to the assignee of the present application, there is disclosed a direct current motor which requires no mechanical commutator. Generally stated, in the motor disclosed therein, a plurality of flux-producing windings are positioned in a stator member in torque-producing relation with a permanent magnet rotor member. Each of the windings is connected to a source of unidirectional potential through a controllable rectifying device, preferably of the solid state type. An equal plurality of Hall generator elements are positioned in the stator member in magnetic relation with the permanent magnet rotor member to sense the angular position of the rotor member so as to sequentially fire the controlled rectifiers upon coincident interaction of magnetic flux emanating from the rotor and pulsed energy applied to the Hall elements, and thus provide a continuous driving torque on the rotor member. The abovementioned application also discloses means for obtaining speed reversibility of this motor by controlling the sequence of motor winding energization.

The present invention may be considered an improvement to the motor of the aforementioned copending application in that it provides a direct current commutatorless motor using more simple and economical means for obtaining motor operation, including motor reversal.

Accordingly, it is an object of this invention to provide an improved direct current motor of the type wherein flux-producing windings are sequentially energized to produce a driving torque on a rotor member and which utilizes a simple and economical means for sensing rotor position and energizing the windings.

It is a further object of this invention to provide an improved direct current motor using solid state switching devices to sequentially energize flux-producing windings which produce a driving torque on a rotor member of the motor, where direction of motor rotation is easily and economically controlled.

It is another object of this invention to provide an improved direct current motor, requiring no mechanical commutator, in which a plurality of flux-producing windings are sequentially energized through solid state controlled rectifiers, as motor shaft position is sensed upon rotation thereof, to produce a driving torque on the rotor member of the motor, and which requires only half as many shaft position sensors as there are flux-producing windings in the motor.

Briefly stated, the invention in one form thereof comprises an improved direct current solid state commutator motor having a permanent magnet rotor member and $2n$ flux-producing windings positioned in the stator member in torque-producing relation with the permanent magnet rotor member, where $n$ is an integer. That is, an even number of armature windings are positioned in the stator member. Each of the windings is connected to a source of unidirectional potential through a switching device which has control means for rendering the switching device conductive to energize its respective winding. The motor also has a pair of Hall effect generators for each direction of rotation of the motor positioned in flux-sensing relation with the rotor member. The Hall effect generators are energized from a source of unidirectional electric current so that the polarity of the output signals from the Hall effect generators is dependent upon the polarity of the magnetic flux to which the Hall effect generators are subjected. As the permanent magnet rotor member rotates and sequentially generates output signals in the Hall effect generators, the switching devices are rendered conductive in a predetermined sequence and the flux-producing windings are therefore energized in a predetermined sequence to produce a driving torque on the rotor member in predetermined direction.

The novel features of the invention are pointed out with particularity in the claims appended to and forming part of this specification. However, the invention, both as to its organization and operation and further objects and advantages thereof, may best be understood by reference to the following description taken in conjunction with the drawings wherein FIG. 1 shows a circuit diagram of an improved direct current motor embodying the subject invention;

FIGS. 2a, 2b, 2c and 2d show the angular relation between the rotor flux and the armature fields of the motor of FIG. 1 for various angular positions of the rotor;

FIG. 3 shows, in graphical form, the relation between the instantaneous torque acting on the rotor member and the angular position of the rotor of the motor of FIG. 1;

FIG. 4 is illustrative of a Hall effect generator which may be used with the invention;

FIGS. 7a, 7b, 7c and 7d show the angular relation between the rotor flux and armature flux of the motor of FIG. 6 for various angular rotor positions to the motor;

FIG. 8 shows a circuit diagram of a pulse generator similar to that shown in FIG. 5 which may be used to energize the Hall effect generators of the motor of FIG. 6; and FIG. 9 shows the circuit diagram of a direct current solid state commutator motor embodying the invention.

Figure 5:
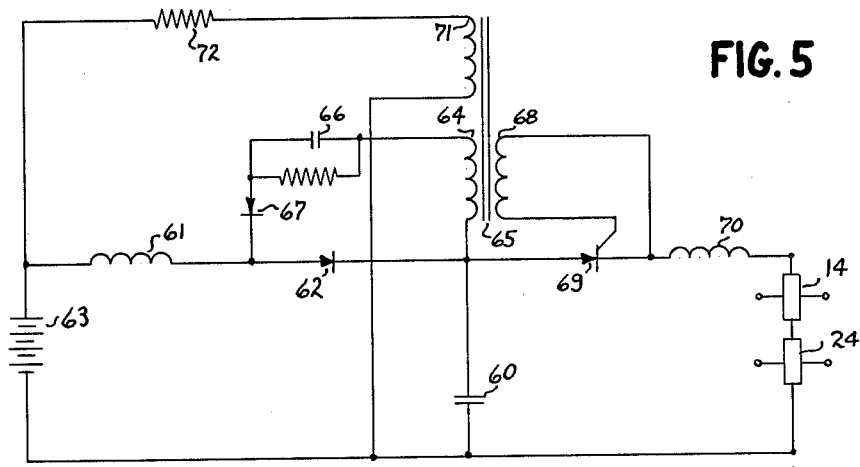
FIG. 5 shows the circuit diagram of a pulse generator which may be used to energize the Hall effect generators of the motor of FIG. 1.

Reference is now made to FIG. 1, which shows an improved direct current solid state commutator motor in accordance with the invention. Four flux-producing windings 1, 2, 3 and 4 are positioned about magnetic poles, not shown, in spaced relation within a stator member, not shown, of the motor. A permanent magnet rotor member 5, illustrated as a bar magnet providing north (N) and south (S) magnetic poles, is mounted on the motor shaft, not shown. The figure shows schematically a bar magnet which is centrally pivoted, although in practice the permanent magnet rotor member 5 may be a cylindrical permanent magnet rotor or a dumbbell-shaped permanent magnet rotor, or, if the use of slip rings is not prohibited, the rotor could be a wound rotor. Each of the motor windings 1, 2, 3 and 4 has one terminal thereof connected to the positive terminal of a source of unidirectional potential, shown as a battery 6. The other terminals of windings 1, 2, 3 and 4 are connected to the negative terminal of battery 6 and a point of reference potential (ground) 7 through solid state switching devices 10, 20, 30 and 40 respectively. Commutating capacitors 8 and 9 are connected between the anodes of rectifiers 20, 40 and 10, 30 respectively, as hereinafter explained. The switching devices are preferably silicon controlled rectifiers. Each of the controlled rectifiers 10, 20, 30 and 40 has a cathode electrode terminal 11, 21, 31 and 41, an anode electrode terminal 12, 22, 32 and 42 and a gating electrode terminal 13, 23, 33 and 43, all respectively. The cathode electrodes 11, 21, 31 and 41 are connected to the negative terminal of source 6 and to the point 7 of reference potential and the anode electrodes 12, 22, 32 and 42 are connected through the other terminals of motor windings 1, 2, 3 and 4 respectively to the positive terminal of battery 6.

The illustrated motor also includes two solid state magnetic sensory elements, Hall effect generators 14 and 24, which are positioned in predetermined magnetic flux-sensing relation with permanent magnet rotor member 5. Energizing current for Hall effect generators 14 and 24 may be provided through terminals 18 and 28. Upon the coincident interaction within Hall effect generators 14 and 24 of energizing current and a predetermined condition of magnetic flux, output signals are generated by the Hall elements 14 and 24 and applied to the primary windings of transformers 15 and 25 respectively. The polarity of the output signals of the Hall effect generators is dependent upon both the polarity of the energizing current and the polarity of the magnetic flux to which the Hall effect generators are subjected. Thus, if a unidirectional current is connected through terminals 18 and 28, the polarity of the output signals from Hall effect generators 14 and 24 will be dependent only upon the polarity of magnetic flux to which the generators are subjected. The Hall effect generators thus provide output signals of a first polarity when proximate to and subjected to a magnetic flux from the north pole N of rotor member 5 and provide output signals of a second and opposite polarity when proximate to and subjected to the magnetic flux from the south pole S of rotor member 5.

Transformers 15 and 25 include primary windings which are directly connected to the output terminals of Hall effect generators 14 and 24 respectively and secondary windings which have a center tap connected to the point of reference potential. Such a transformer will provide a positive output signal with respect to the point of reference potential at one end terminal of the secondary winding for an input signal of one polarity and a positive output signal at the other end terminal of the secondary winding for an input signal of the opposite polarity. When Hall effect generators 14 and 24 are subjected to magnetic flux from a south pole, positive going rectifier gating signals are applied to gating electrodes 13 and 23 of controlled rectifiers 10 and 20 respectively through transformer 15 and diode 16 and transformer 25 and diode 26 respectively. However, when Hall effect generators 14 and 24 are subjected to magnetic flux from a north pole, positive going rectifier gating signals are applied to gating electrodes 33 and 43 of controlled rectifiers 30 and 40 respectively through transformer 15 and diode 17 and transformer 25 and diode 27 respectively. If desired, diodes 16, 17, 26 and 27 may be omitted, since negative pulses applied to the gating electrodes will have no effect on the controlled rectifiers.

The operation of the motor of FIG. 1 is as follows: Assume that rotor member 5 is in the position shown in FIG. 1. From the coincident interaction within Hall effect generators 14 and 24 of magnetic flux from the south pole of the rotor member 5 and energizing current applied to input terminals 18 and 28, positive going gating signals generated within Hall effect generators 14 and 24 will be applied to the gate electrodes 13 and 23 of controlled rectifiers 10 and 20 respectively. These gate signals will trigger controlled rectifiers 10 and 20 into conduction and unidirectional current will flow from source 6 through the windings 1 and 2, establishing a resultant armature flux $F_{12}$.

FIG. 2a shows the angular relation between the armature field $F_{12}$ produced by winding 1 and rotor flux $\phi_R$. The action of armature field $F_{12}$ on the rotor member 5 will result in a clockwise torque on rotor member 5, which will rotate in a clockwise manner.

When rotor member 5 has rotated clockwise 90°, Hall effect generator 14 becomes subjected to flux from the north pole N of rotor member 5 and upon coincident interaction of magnetic flux from south pole S and energizing current applied to Hall effect generator 14 from terminals 18 and 28, Hall effect generator 14 applies a positive gating signal to gate electrode 33 of controlled rectifier 30. This gating signal triggers controlled rectifier 30 into conduction and unidirectional current then flows from the source 6 through winding 3. At the instant controlled rectifier 30 is triggered into conduction, commutating capacitor 9 is short circuited through windings 1 and 3 and in discharging through winding 1 extinguishes rectifier 10.

The angular relation between the armature field $F_{23}$, established when unidirectional current is flowing through windings 2 and 3, and rotor flux $\phi_R$ is shown in FIG. 2b. The action of this armature field $F_{23}$ on rotor member 5 results in continued clockwise torque on rotor member 5.

In a like manner, when rotor member 5 rotates through another 90° clockwise, Hall effect generator 24 is subjected to flux from the north pole N of rotor member 5 and applies a positive gating signal to gate electrode 43 of controlled rectifier 40, thereby triggering controlled rectifier 40 into conduction. Communicating capacitor 8 then discharges through winding 2 and extinguishes controlled rectifier 20 and armature field $F_{34}$, due to the flux produced by windings 3 and 4, exerts a continuing clockwise torque on rotor member 5, as shown in FIG. 2c. A subsequent 90° clockwise rotation results in Hall effect generator 14, once again being subjected to flux from the south pole S of rotor member 5, triggering controlled rectifier 10 into conduction, commutating capacitor 9 extinguishing controlled rectifier 30 in a manner heretofore explained, and armature field $F_{41}$, due to flux produced by windings 4 and 1, exerting a continuing clockwise torque on rotor member 5, as shown in FIG. 2d. In this manner, the armature windings 1, 2, 3 and 4 are sequentially energized and extinguished to produce a driving clockwise torque on rotor member 5.

The instantaneous magnitude of this clockwise torque may be given by the expression $$T_R = \sqrt{2} KIN\phi_R \sin \theta$$

where:

$T_R$ = driving torque acting on the rotor member 5
$K$ = a constant
$I$ = the current flowing in the windings
$N$ = the number of turns of each armature winding
$\phi_R$ = the magnitude of the rotor flux from the permanent magnet rotor 5
$\theta$ = the instantaneous angular displacement between the resultant armature field and the rotor flux $\phi_R$ The value of θ changes from 135° at a time when a new winding begins conducting unidirectional current to 45° at a time immediately before a subsequent winding begins conducting unidirectional current, at which time the value of θ abruptly returns to 135°. Thus, the above expression shows that the instantaneous torque on the rotor member 5 varies from .707 $T_{R\ max.}$ to $T_{R\ max.}$ to .707 $T_{R\ max.}$ for each 90° of rotation of the rotor member 5, with the maximum instantaneous torque acting on the rotor member 5 when it is normal to the aramture flux. The graphical relation of the instantaneous torque on the rotor and the angular rotor position is shown in FIG. 3.

FIG. 4 illustrates, in simplified form, a Hall effect generator. The device comprises a slab 50 of a material such as indium antimonide or indium arsenide having input terminals 51 and 52 which are electrically connected to the ends thereof and output terminals 53 and 54 which are electrically connected to the sides thereof. The device operates on the Hall effect principle which is known to those skilled in the art. If a magnetic field of flux density B be applied perpendicular to the face of the slab 50 and an energizing current $I_c$ is applied between input terminals 51 and 52, an output voltage is developed between output terminals 53 and 54. The reason that the output voltage is developed is that the magnetic field deflects the charge carriers moving between input terminals 51 and 52, building up a positive charge at one output terminal and a negative charge at the other output terminal. This output voltage is called the Hall voltage and is equal to $$V_H = R_h \frac{I_c B}{d}$$

where:

$V_H$=Hall voltage
$R_H$=Hall constant
$I_c$=Applied energizing curernt
$B$=Flux denisty of magnetic field applied
$d$=Thickness of slab 50

The polarity of Hall Voltage $V_H$ is dependent upon both polarity of the applied energizing current $I_c$ and of the flux density B of the magentic field applied to the Hall effect generator. Thus, if the Hall effect generator is energized by a unidirectional current, the polarity of the output voltage will be dependent solely upon the polarity of the applied magnetic flux and the generator will have an output signal of a first polarity when subjected to magnetic flux from the north pole and an output signal of a second polarity when subjected to magnetic flux from a south pole.

For an applied magnetic field of 10,000 gauss and maximum rated D.C. applied control current of 500 milliamps., the Hall voltage delivered by present commercially available Hall effect generators is approximately 300 to 500 millivolts, depending upon the thickness of the slab used in the generator. Present commercially available silicon controlled rectifiers require a gate voltage of about 3 volts to assure successful triggering of the controlled rectifier into conduction. However, this gate voltage must exist for the duration only of a few microseconds in order to fire the controlled rectifier.

In order to supply a gating signal of sufficient magnitude to trigger a controlled rectifier into conduction, the Hall effect generators in the motor of FIG. 1 may be supplied with an energizing current which comprises a series of repetitive pulse currents of relatively large magnitude and extremely short time duration, as disclosed in the aforementioned copending application Serial No. 159,539. When the rotor field penetrates one of the Hall effect generators, one particular pulse will then be sufficient to fire the associated controlled rectifier and the succeeding pulses will have no effect on the controlled rectifier.

FIG. 5 shows schematically a diagram of a suitable pulse generator which may be used to supply repetitive pulse current of relatively large magnitude and extremely short duration to the input terminals 18 and 28, although of course, any suitable pulse generator which would supply such an energizing current could be used with the invention. The operation of this circuit is as follows: Capacitor 60 is charged through inductance 61 and diode 62 by a unidirectional potential source 63. As is well known to those skilled in the art, capacitor 60 charges to a voltage equal to approximately twice the value of voltage of source 63, at which time the current attempts to reverse itself, with capacitor 60 discharging back through inductance 61. However, diode 62 blocks such a current flow and capacitor 60 starts to discharge through primary winding 64 of transformer 65, capacitor 66 and diode 67 and then through inductance 61 and source 63. This discharge through primary winding 64 causes a voltage to appear in secondary winding 68 of transformer 65, which in turn triggers controlled rectifier 69 into conduction. Capacitor 60 then continues its discharge by discharging through inductance 70 and the series circuit of Hall effect generators 14 and 24, whereby the pulse energizing current is applied to the input terminals of the Hall effect generators. Controlled rectifier 69 is extinguished when the current in this branch of the circuit attempts to reverse itself. The time duration and peak magnitude of the applied pulses may be controlled by controlling the value of inductance 70. Thus, if the value of inductance 70 is much smaller than the value of inductance 61, a discharge pulse from capacitor 60 of high magnitude and short time duration may be obtained. The pulse repetition frequency of the circuit is determined primarily by the values of inductance 61 and capacitor 60 and to a lesser extent by the value of inductance 70. If desired, transformer 65 may also have a bias winding 71 thereon, with the magnitude of the current in this winding being controlled by resistor 72. Capacitor 66 is discharged through resistor 73 during interpulse periods.

Thus, current pulses of relatively large magnitude and quite short duration may be furnished to the Hall effect generators, resulting in a sufficient magnitude of Hall voltage to trigger the associated controlled rectifiers. At the same time, excessive heating effects on the Hall effect generators are avoided by keeping the value of the applied current at a low RMS level.

The speed of the motor of FIG. 1 may be controlled by controlling the voltage of source 6. If source 6 is a constant potential source, as illustrated, the voltage applied to the windings 1, 2, 3 and 4 may be regulated with a chopper type amplifier placed between the voltage source and the windings, as disclosed in the aforementioned copending application, Serial No. 159,539.

In the motor shown in FIG. 1, a clockwise torque is developed on the rotor member 5 and accordingly, rotor member 5 rotates in a clockwise direction. Torque reversal, and accordingly speed reversal, could be obtained by rotating the Hall effect generators 90° counterclockwise or by connecting the output of the Hall effect generators to controlled rectifiers positioned 90° clockwise from the connections shown in the figure. However, it is usually not practical to physically change the position of elements within the motor or to change electrical connections of the elements.

Figure 6:
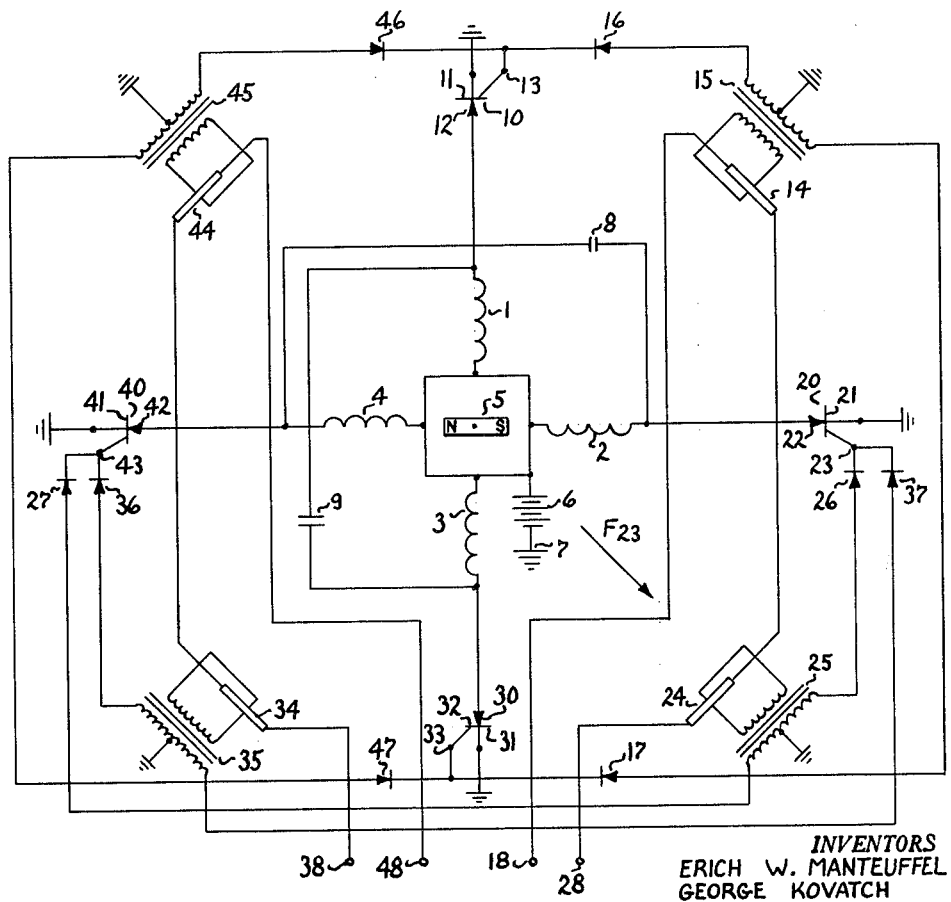
FIG. 6 shows the circuit diagram of a direct current solid state commutator motor similar to that of FIG. 1 in which the direction of rotation may be electrically controlled.

FIG. 6 shows an arrangement whereby the direction of rotation of the rotor member may be electrically controlled without making any physical changes on the motor structure. FIG. 6 shows, in circuit diagram and schematic form, a motor similar to that shown in FIG. 1, but with the addition of Hall effect generators 34 and 44 and their associated circuitry to provide a reversible motor arrangement. The output signals from Hall effect generator 34 are applied to transformer 35 and the output signals from Hall effect generator 44 are applied to transformer 45.

Transformers 35 and 45 are similar to transformers 15 and 25. Hall effect generators 34 and 44 may be energized through terminals 38 and 48. The output signals generated in Hall effect generators 34 and 44 when subjected to flux from a north magnetic pole are connected through transformer 35 and diode 36 to gating electrode 43 of controlled rectifier 40 and transformer 45 and diode 46 to gating electrode 13 of controlled rectifier 10 respectively. The output signals generated in Hall effect generators 34 and 44 when subjected to flux from a south magnetic pole are connected through transformer 35 and diode 37 to gating electrode 23 of controlled rectifier 20 and transformer 45 and diode 47 to gating electrode 33 of controlled rectifier 30 respectively.

The operation of the motor is as follows: When only the Hall effect generators 14 and 24 are energized through terminals 18 and 28, and the rotor member 5 is in the position shown, the operation is the same as was described in FIG. 1, and rotor member 5 rotates in a clockwise manner, as previously described. However, when only Hall effect generators 34 and 44 are energized through terminals 38 and 48 and the rotor member 5 is in the position shown, controlled rectifiers 20 and 30 are triggered into conduction, establishing a resultant armature field $F_{23}$ to rotate the rotor member 5 in a counterclockwise direction.

FIGS. 7a through 7d will now be referred to in order to describe in detail the flux relations when using only Hall effect generators 34, 44 to drive the rotor in the counterclockwise direction. FIG. 7a shows the angular relation between rotor flux $\phi_R$ and armature field $F_{23}$, due to the flux produced by windings 2 and 3, when rotor member 5 is in the position shown. Such an angular flux relationship results in a counterclockwise torque on rotor member 5 and accordingly, rotor member 5 rotates in a counterclockwise manner.

When rotor member 5 has rotated to 90° counterclockwise, Hall effect generator 44 becomes subjected to flux from the south pole S of rotor member 5 and triggers controlled rectifier 10 into conduction. Commutating capacitor 9 extinguishes controlled rectifier 30 and armature field $F_{12}$, due to the flux produced by windings 1 and 2, is established. FIG. 7b shows the angular relation between the rotor flux and armature field $F_{12}$. This armature field causes a continuing counterclockwise torque on rotor member 5, which continues to rotate in a counterclockwise manner. When rotor member 5 is rotated through a subsequent 90° counterclockwise, the south pole S of rotor member 5 becomes proximate to Hall effect generator 34, which supplies a positive gating signal to controlled rectifier 40, whereby unidirectional current flows in winding 4. Commutating capacitor 8 extinguishes controlled rectifier 20, and the resultant armature field $F_{41}$, due to the flux produced by windings 4 and 1, is established. FIG. 7c shows the angular relation between armature field $F_{41}$ and rotor flux $\phi_R$ when the rotor is in this position. Again, a continuing counterclockwise torque is exerted on rotor member 5, which maintains the counterclockwise rotation of rotor member 5. A subsequent 90° counterclockwise rotation of rotor member 5 results in Hall effect generator 44 triggering controlled rectifier 30 into conduction, commutating capacitor 9 extinguishing controlled rectifier 10, the establishment of armature field $F_{34}$, due to the flux produced by windings 3 and 4, and the angular flux relationship shown in FIG. 7d. Thus, a continuing counterclockwise torque is maintained on rotor member 5, which rotates in a counterclockwise direction.

FIG. 8 illustrates a circuit diagram of a pulse oscillator which may be used to energize the Hall effect generators of the motor of FIG. 7. The pulse oscillator shown therein is similar to that of FIG. 5, except that the output circuit now includes two parallel branches with Hall effect generators 14 and 24 in one branch and Hall effect generators 34 and 44 in the other branch. Also, diode 62 of FIG. 5 has been replaced by controlled rectifier 78 which may be triggered into conduction by pulse oscillator 74, which is connected to the gating electrode of controlled rectifier 78 through transformer 75. Oscillator 74, which may be a pulse oscillator of any suitable circuit configuration, controls the conduction of controlled rectifier 78, and thus controls the repetition rate at which pulses are supplied to the Hall effect generators. The period between output pulses of oscillator 74 is selected to be greater than the time required to charge capacitor 60 through inductance 61 and to discharge it through inductance 70.

The operation of the circuit of FIG. 8 is the same as that described in FIG. 5 except that now the secondary winding 68 of transformer 65 is connected through a switch 77, illustrated as being of the single pole, double-throw type, to either the gate electrode of controlled rectifier 69 or the gate electrode of controlled rectifier 76. Thus, depending upon the position of switch 77, either controlled rectifier 69 or controlled rectifier 76 is repetitively rendered conductive and extinguished. Capacitor 60 is discharged by inductance 70 and either Hall effect generators 14 and 24 or Hall effect generators 34 and 44, depending upon the position of switch 77. Switch 77 may be a conventional mechanical switch or may be of the static type.

In all the examples shown thus far, two windings are conducting unidirectional current at any given instant, with the two conducting windings being electrically connected in parallel. FIG. 9 shows another embodiment of the invention in which the two conducting windings are serially connected such that the same current flows through each winding. The operation of this circuit is as follows: Assuming the Hall effect generators to be connected in the same manner as is shown in FIG. 1, when the rotor member 5 is in the shown position, Hall effect generators 14 and 24, subject to flux from the north pole N of rotor member 5, supply gating pulses to controlled rectifiers 20 and 30 respectively, triggering these controlled rectifiers into conduction. Unidirectional current of source 6 flows through the series circuit comprising winding 2, controlled rectifier 20, winding 3 and controlled rectifier 30, thereby establishing a resulting armature field $F_{23}$, due to flux produced by windings 2 and 3, which exerts a clockwise torque on rotor member 5, causing clockwise rotation of rotor member 5. When rotor member 5 rotates through 90° clockwise, Hall effect generator 14, subject to flux from the south pole rotor member 5, triggers controlled rectifier 10 into conduction, and commutating capacitor 9 extinguishes controlled rectifier 30. The series circuit now comprises the source 6, winding 2, controlled rectifier 20, winding 1 and controlled rectifier 10. The resultant armature field $F_{12}$, due to flux produced by windings 2 and 3, maintains the clockwise torque on rotor member 5. A subsequent 90° clockwise rotation of rotor member 5 results in Hall effect generator 24 triggering rectifier 40 into conduction, and capacitor 8 extinguishing controlled rectifier 20. The series circuit now comprises source 6, winding 4, rectifier 40, winding 1 and rectifier 10 and the resultant armature field $F_{41}$, due to flux produced by windings 4 and 1, maintains the clockwise torque on rotor member 5. Thus, in a manner similar to that previously described, windings 1, 2, 3 and 4 are sequentially energized so as to provide a clockwise driving torque on rotor member 5.

It will be apparent that the series armature arrangement of FIG. 9 could also be provided with additional Hall effect generators such as is shown in FIG. 6 to provide a reversible motor.

All the embodiments of the invention shown thus far utilize semiconductor controlled rectifiers, such as silicon controlled rectifiers, and Hall effect generators in which the supplied energizing control current comprises a recurring series of pulses of relatively large magnitude and short duration. If a Hall effect generator were provided which had sufficiently high output voltage to trigger controlled rectifiers in conduction, it would not be necessary to supply the pulsed energization arrangement for the Hall effect generators. Also, if a Hall effect generator were provided which has an output voltage sufficient to maintain conduction in a power transistor, the silicon controlled rectifiers could be replaced by conventional power transistors. If transistors are used with the invention, no commutating capacitors are required to extinguish the transistors, since their conduction can be fully controlled by applied base voltage.

While the invention is thus described and a number of embodiments shown, the invention is not limited to these shown embodiments. Instead, many modifications will be obvious to those skilled in the art which lie within the spirit and scope of the invention. For example, the invention is not limited to use with a motor which has four poles with flux-producing windings thereon. It may be used with a motor having any even number of windings, it being only necessary to provide a sufficient number of Hall effect generators or similar magnetic detectors to provide a distinct gating signal for each of the controlled rectifiers connected to the windings so as to sequentially energize the windings and produce a driving torque on the rotor member. It will be apparent, however, that a motor with only two poles and one Hall generator would not always, dependent on the position of the rotor, start by itself, and also the torque produced on the rotor would be in undesirable large pulsations. If it is not convenient to position the Hall effect generators in the stator member in magnetic relation with the rotor member, an auxiliary permanent magnet may be provided on the motor shaft and may then be appropriately positioned in magnetic relation with the auxiliary magnet so as to sense the angular position of the magnet, and thus the angular position of the rotor member, as described in the aforementioned copending application Serial No. 159,539, the complete disclosure of which is incorporated herein by reference. Also, the Hall effect generators and commutating capacitors can be arranged so that only one winding is conductive at any given instant, rather than two windings as shown, and if more than four windings are provided, the Hall effect generators and commutating capacitors can be positioned so as to provide any desired number of energized windings at a given instant.

Accordingly, it is intended to cover in the appended claims all embodiments and modifications to the disclosed embodiments of the invention chosen for purpose of disclosure, which do not depart from the spirit and scope of the invention.

What is claimed as new and is desired to be secured by Letters Patent of the United States is:

1. An electric motor energizable from a source of unidirectional potential comprising:
   (a) a rotor member having magnetic poles of opposite polarity thereon;
   (b) a stator member, an even number of armature windings positioned in said stator member in torque-producing relation with said rotor;
   (c) a plurality of solid-state switching devices each having control means for rendering its associated switching device conductive, each of said switching devices controlling the connection of a respective one of said windings to a source of unidirectional potential so that unidirectional current will flow in each of said windings when its respective switching device is conducting;
   (d) a pair of Hall effect generators for each direction of motor rotation positioned to sense flux emanating from said magnetic poles;
   (e) means for applying energizing electrical current to one pair of said Hall generators; and
   (f) means associated with each of the Hall effect generators of said pair for applying a gating signal to the control means of a first switching device to establish current flow within the armature windings of said motor to produce an armature field in a first direction when said Hall effect generator is under the coincident inter-action of its applied energizing current and rotor flux of a first polarity and for applying a gating signal to the control means of a second switching device to establish current flow in the armature winding of said motor to produce an armature field electrically displaced 180 degrees from said first armature field when that same Hall effect generator is under the coincident inter-action of its applied energizing current and rotor flux of a second polarity.

2. An electric motor according to claim 1 in which more than one of said solid state switching devices are conducting at a given time and in which the windings associated with the conducting switching devices are electrically connected in parallel.

3. An electric motor according to claim 1 in which more than one of said solid state switching devices are conducting at a given time and in which the windings associated with the conducting switching devices are electrically connected in series.

4. The motor of claim 1 wherein said means associated with each of said Hall effect generators comprises transformer means having a primary winding and a center tapped secondary winding, said primary winding being coupled to the associated Hall effect generator and said secondary winding being connected to apply pulses of opposite polarity to the control means of said first and second switching devices to selectively render one of said switching devices conductive.

5. An electric motor energizable from a source of unidirectional potential comprising:
   (a) a rotor member having magnetic poles of opposite polarity thereon;
   (b) a stator member, an even number of armature windings positioned in said stator member in torque-producing relation with said rotor member;
   (c) the same even number of controlled rectifiers each having control means for rendering its associated rectifier conductive, each of said rectifiers controlling the connection of one of said windings to a source of unidirectional potential so that unidirectional current will flow in each of said windings when its respective switching device is conductive;
   (d) a pair of Hall generators for each direction of motor rotation positioned to be responsive to different respective angular positions of said rotor member;
   (e) means for applying energizing electrical current to one pair of said Hall generators;
   (f) means associated with each of the Hall effect generators of said pair for applying a gating signal to the control means of a first switching device to establish current flow within the armature windings of said motor to produce an armature field in a first direction when said Hall effect generator is under the coincident inter-action of its applied energizing current and rotor flux of a first polarity and for applying a gating signal to the control means of a second switching device to establish current flow in the armature winding of said motor to produce an armature field electrically displaced 180 degrees from said first armature field when that same Hall effect generator is under the coincident inter-action of its applied energizing current and rotor flux of a second polarity; and
   (g) means responsive to the conduction of each of said rectifiers for extinguishing a respective selected previously conducting rectifier, whereby said windings are sequentially energized to produce a driving torque on said rotor member.

6. The motor of claim 5 wherein said means associated with each of said Hall generators comprises transformer means having a primary winding and a center tapped secondary winding, said primary winding being coupled to the associated Hall generator and said secondary winding being connected to apply pulses of opposite polarity to the control means of said first and second switching devices to selectively render one of said switching devices conductive.

7. An electric motor energizable from a source of unidirectional potential comprising:
   (a) a rotor member having magnetic poles of opposite polarity thereon;
   (b) a stator member, an even number of armature windings positioned in said stator member in torque-producing relation with said rotor member;
   (c) the same even number of solid state switching devices each having control means for rendering its associated switching device conductive, each of said switching devices controlling the connection of a respective one of said windings to a source of unidirectional potential whereby unidirectional current will flow in each of said windings when its respective switching device is conducting;
   (d) one pair of Hall generators positioned to be responsive to different respective angular positions of said rotor member;
   (e) means for applying pulses of energizing electrical current to said Hall generators; and
   (f) means associated with each of the Hall effect generators of said pair for applying a gating signal to the control means of a first switching device to establish current flow within the armature windings of said motor to produce an armature field in a first direction when said Hall effect generator is under the coincident inter-action of its applied energizing current and rotor flux of a first polarity and for applying a gating signal to the control means of a second switching device to establish current flow in the armature winding of said motor to produce an armature field electrically displaced 180 degrees from said first armature field when that same Hall effect generator is under the coincident inter-action of its applied energizing current and rotor flux of a second polarity.

8. An electric motor energizable from a source of unidirectional potential, comprising:
   (a) a rotor member having magnetic poles of opposite polarity thereon;
   (b) a stator member, an even number of armature windings positioned in said stator member in torque-producing relation with said rotor member;
   (c) the same even number of semi-conductive controlled rectifiers each having control means for rendering its associated rectifier conductive, each of said rectifiers controlling the connection of a respective one of said windings to a source of unidirectional potential whereby unidirectional current will flow in each of said windings when its respective rectifier is conducting;
   (d) a pair of Hall generators positioned to be responsive to different respective angular positions of said rotor member;
   (e) means for applying pulses of energizing electrical current to said Hall generators;
   (f) means associated with each of the Hall effect generators of said pair for applying a gating signal to the control means of a first switching device to establish current flow within the armature windings of said motor to produce an armature field in a first direction when said Hall effect generator is under the coincident inter-action of its applied energizing current and rotor flux of a first polarity and for applying a gating signal to the control means of a second switching device to establish current flow in the armature winding of said motor to produce an armature field electrically displaced 180 degrees from said first armature field when that same Hall effect generator is under the coincident inter-action of its applied energizing current and rotor flux of a second polarity; and
   (g) means responsive to the conduction of each of said respective rectifiers for extinguishing a selected previously conducting rectifier, whereby said windings are sequentially energized to produce a driving torque on said rotor member.

9. The motor of claim 8 wherein said means associated with each of said Hall generators comprises transformer means having a primary winding and a center tapped secondary winding, said primary winding being coupled to the associated Hall generator and said secondary winding being connected to apply pulses of opposite polarity to the control means of said first and second switching devices to selectively render one of said switching devices conductive.

10. An electric motor energizable from a source of unidirectional potential comprising:
    (a) a rotor member having magnetic poles of opposite polarity thereon;
    (b) a stator member, an even number of armature windings positioned in said stator member in torque-producing relation with said rotor member;
    (c) solid state switching devices having control means to render said switching devices conductive controlling the connection of each of said windings to a source of unidirectional potential whereby unidirectional current will flow in each of said windings when its respective switching device is conducting;
    (d) first and second pairs of Hall generators positioned to be responsive to different angular positions of said rotor member;
    (e) means associated with each of said Hall effect generators for applying a gating signal to the control means of a first switching device to establish current flow within the armature windings of said motor to produce an armature field in a first direction when said Hall effect generator is under the coincident inter-action of an applied energizing current and rotor flux of a first polarity and for applying a gating signal to the control means of a second switching device to establish current flow in the armature winding of said motor to produce an armature field electrically displaced 180 degrees from said first armature field when that same Hall effect generator is under the coincident inter-action of an applied energizing current and rotor flux of a second polarity;
    (f) and means for applying energizing electric current to only said first pair of Hall generators whereby said armature windings are energized to provide driving torque on said rotor member in a first direction and for applying energizing electric current to only said second pair of Hall generators whereby said armature windings are energized to provide driving torque on said rotor member in a second direction.

11. An electric motor according to claim 10 in which more than one of said solid state switching devices are conducting at a given time and in which the windings associated with the conducting switching devices are electrically connected in parallel.

12. An electric motor according to claim 10 in which more than one of said solid state switching devices are conducting at a given time and in which the respective windings associated with the conducting switching devices are electrically connected in series.

13. The motor of claim 10 wherein said means associated with each of said Hall generators comprises transformer means having a primary winding and a center tapped secondary winding, said primary winding being coupled to the associated Hall generator and said secondary winding being connected to apply pulses of opposite polarity to the control means of said first and second switching devices to selectively render said switching devices conductive.

14. An electric motor energizable from a source of unidirectional potential, comprising:
  (a) a rotor member having magnetic poles of opposite polarity thereon;
  (b) a stator member, an even number of armature windings positioned in said stator member in torque-producing relation with said rotor member;
  (c) a plurality of semi-conductor controlled rectifiers each having control means for rendering its associated rectifier conductive, each of said rectifiers controlling the connection of one of said windings to a source of unidirectional potential whereby unidirectional current will flow through each of said windings when its respective rectifier is conducting;
  (d) first and second pairs of Hall geneators positioned to be responsive to different angular positions of said rotor member;
  (e) means associated with each of said Hall effect generators for applying a gating signal to the control means of a first switching device to establish current flow within the armature windings of said motor to produce an armature field in a first direction when said Hall effect generator is under the coincident inter-action of an applied energizing current and rotor flux of a first polarity and for applying a gating signal to the control means of a second switching device to establish current flow in the armature winding of said motor to produce an armature field electrically displayed 180 degrees from said first armature field when that same Hall effect generator is under the coincident inter-action of an applied energizing current and rotor flux of a second polarity;
  (f) means responsive to the conduction of each of said rectifiers for extinguishing a respective selected previously conducting rectifier, whereby said windings are energized in a first predetermined sequence to produce a driving torque in a first predetermined direction on said rotor member;
  (g) and means for applying energizing electric current to only said first pair of Hall generators whereby said armature windings are energized to provide driving torque on said rotor member in a first direction and for applying energizing electric current to only said second pair of Hall generators whereby said armature windings are energized to provide driving torque on said rotor member in a second direction.

References Cited by the Examiner
UNITED STATES PATENTS

| | | | |
|---|---|---|---|
| 2,512,325 | 6/50 | Hansen | 310—10.1 |
| 2,814,008 | 11/57 | Staniloff | 318—138 |
| 2,995,690 | 8/61 | Lemon | 318—138 |

ORIS L. RADER, *Primary Examiner.*